Patented Feb. 24, 1942

2,274,305

UNITED STATES PATENT OFFICE 2,274,305

LUBRICATING COMPOSITION

Theron P. Remy, Los Angeles, Calif.

No Drawing. Application May 6, 1938,
Serial No. 206,400

6 Claims. (Cl. 252—58)

The present invention relates to improvements in lubricating oil compositions and particularly to improvements in compounded petroleum lubricating oils. The trend of development in internal combustion engines particularly is toward closer clearances and other mechanical features which make increasing demands on oils used for lubrication. These demands are primarily directed to the capacities of the lubricant to withstand higher operating temperatures and increased load pressures. Motor oils and other lubricants which are subjected to high temperatures show a marked decomposition by oxidation, sludge formation and similar activity and because of this the use factors of a lubricant are dependent upon thermal stability. Thermal stability is determined by the extent of oxidation or decomposition and the resultant products of such reaction with respect to the amount and location of its production within the engine. The deterioration so produced has been checked to some extent by the addition of materials such as oxidation inhibitors but these in turn have produced other problems to the extent that they are not now considered commercially practical.

A lubricant has three fundamental functions: One of these is to reduce friction between rubbing surfaces. Another is to provide compression through partial sealing rings or moving parts in a compression zone. And the third is to assist in heat dissipation through transfer. In the accomplishment of these three functions, there are at least two different forms of activity. In the reduction of friction oil lubricates by means of a thick film which in rotating members is actually pumped around the large part of the bearing surface due to the motion of the rotating parts. The other kind of activity is boundary lubrication which occurs at points and times where bearing pressures completely overcome the resistance of the thick film lubrication and approach metal to metal contact. This boundary lubrication is entirely due to adsorbed and polar molecules.

It is well known that where any member rotates within a bearing regardless of the oil used, the point of closest approach becomes smaller with heavier loading or increased speed. When these factors reach a certain point the lubricating film which has been hereinbefore termed "thick film lubrication" becomes too thin to keep the surfaces apart and a change in the type of lubrication occurs. This change is believed to proceed from full fluid lubrication through a semi-fluid lubrication and into boundary lubrication which is the lubrication resulting from the adsorbed and polar film. In boundary lubrication the function of physics in the oil disappears and friction is reduced through what is termed "oiliness."

The present invention is principally concerned with what is broadly termed "oiliness" for it is at this point where lubrication completely breaks down and drastic damage results. The quality in oil which is called "film strength" may be said to be the relation of viscosity or thickness of an oil to lubrication in a ratio preventing actual metal to metal contact in bearing surfaces during standing or at the early stages of movement. It is at these times and places that extreme pressures are built up and to such an extent as to rupture or destroy adsorbed and polar film in the ordinary lubricant. It is apparent from the failure occurring in most lubricants, whether compounded or not, that they do not have sufficient capacity to cushion the shock in the sector of greatest pressure which is the major portion of boundary lubrication particularly on starting.

"Oiliness" is a term of relative quality which has the attribute of reduction of friction in lubrication through consideration of molecular physics and oxidation chemistry. "Oiliness" is that property of any liquid to form a powerful anti-friction layer between two solids and is a function of the relationship existing between solid and liquid inter-faces. It may further be described as a polar saturated liquid which reduces the attractions of metals for each other. "Oiliness" is not immediately transmitted to bearing surfaces but is gradually adsorbed to the surfaces to reduce the static coefficient of friction.

It is among the objects of the present invention, therefore, to provide greater oiliness which is the lowered frictional resistance both within the molecular structure of the lubricating oil itself and between the bearing surfaces; to increase film strength particularly in boundary lubrication which enables the lubricating oil to sustain high loads under friction; to minimize deterioration caused by elevated temperatures and thereby to produce a superior action in the reduction of sludge and the elimination of sludge products.

In the accomplishment of the objects hereinbefore set forth, among others which are apparent to those skilled in the art and which are inherently within the disclosure of the present invention, there is compounded within the lubricating oil an agent and it is the addition of this material or its full equivalents which form the principal feature of the present invention, all of which is accomplished without in any way interfering with or deteriorating the value of the oil for lubricating purposes. The invention therefore is directed to an improved additive for lubricating oils as well as to a lubricating oil containing the additive. The improved lubricating oil is composed of a petroleum lubricating oil and a minor proportion of a halogenated isoprene, such as for example the chlorination products of the molecules $C_5H_8$ and $(C_5H_8)_n$ or a mixture of the chlorination products of the molecule $C_5H_8$ and $(C_5H_8)_n$. Highly acceptable products which may be regarded among others as preferable are trichloroisoprene or tetrachloroisoprene or mixtures of the two.

As an example of the invention the additive may be a mixture of trichloroisoprene and tetrachloroisoprene having a total chlorine percentage of 63.8%. This when added to a S. A. E. 30 paraffin motor oil in an amount of 1% by weight of the total will be sufficient to accomplish the objectives of the present invention.

It is well known that temperatures within an engine vary considerably and may be as much as from 3400° F. at the firing point to 160° F. in the crank case. Generally speaking, it is understood that the top piston ring is usually at a temperature of between 800° F. to 900° F. with a minimum of about 900° F. within the combustion chamber. One of the chief objections to chlorinated products in motor oils for example is the fact that they ordinarily begin to decompose at about 450° F. This would mean that ordinary lubricants containing chlorination products would decompose somewhere between the top piston ring and the lower portion of the skirt of the piston. Such being the case the decomposition products, sludge and sludge products would either gum the piston rings or be carried back into the crank case or both. The decomposition is such that there is a formation of acidic reaction products which will combine with any available moisture to form hydrochloric acid. The dangers of such affinity are apparent by the mere statement.

The halogenated isoprenes which form the additive to make the lubricating composition of the present disclosure do not break down until a temperature above approximately 900° F. is reached and therefore the decomposition takes place within the combustion chamber and after the lubricant has reached a vapor state and is combustible. This being true, all of the products of the combustion and decomposition are thoroughly scavenged from the combustion chamber thus preventing the formation of acidic reaction products and preventing the possibility of any decomposition product going back to either gum the piston rings or getting into the crank case.

Although the additive of the present invention is sufficient to accomplish this end, the same may be insured by the addition of a small amount of aromatic hydrocarbon which is soluble in petroleum. The amount which is added to the halogenated isoprene may be varied to meet the different temperature conditions and other requirements of the lubricant, but about 5% by volume will give satisfactory stability. The addition of the aromatic hydrocarbon brings about and insures a stabilization of the halogenated isoprene and mixtures so that heat decomposition will be delayed until it gets into the combustion chamber. It also prevents the formation of hydrochloric acid as a product of combustion. An important advantage of delaying decomposition until reaching the combustion chamber is particularly beneficial with respect to sludging and sludge products for all the products of combustion are scavenged from the combustion chamber.

The addition of amounts of .05% to 2% additive is usually sufficient for general purposes but it is to be understood that greater or lesser amounts may be added to the petroleum lubricating oil in making adjustments to meet the various requirements.

The term "aromatic hydrocarbon" is used as referring broadly to benzine, toluene, their homologues and to other carbocyclic and heterocyclic compounds within the term so long as the hydrocarbon is oil miscible, stable and unreactive with oil and halogenated isoprene at ordinary temperatures and thermally stable in oil up to approximately 900° F.

In place of chlorine, bromine can be employed as can other halogens.

The present invention is not to be construed as limited by any theory relating to the production of the additive or to any theory of the activity of the components of the additive.

I claim:

1. A liquid lubricating oil composition comprising a petroleum lubricating oil and a small proportion of chlorinated isoprene containing more than 50% chlorine.

2. A lubricating oil comprising in combination a major proportion of an oil having lubricating viscosity and a minor proportion of a halogenated isoprene.

3. A liquid lubricating oil composition comprising a petroleum lubricating oil and a small proportion of halogenated isoprenes.

4. A lubricating oil comprising in combination a major proportion of an oil having lubricating viscosity and a minor proportion of a halogenated isoprene stabilized with an oil soluble aromatic hydrocarbon.

5. An oiliness additive comprising halogenated isoprenes of relatively long chain structures stabilized with an oil soluble aromatic hydrocarbon.

6. A lubricating oil comprising a major proportion of a mineral oil having lubricating viscosity and a minor proportion of a material selected from the group consisting of a halogenated isoprene and a halogenated isoprene polymer.

THERON P. REMY.